United States Patent
Snyder

(12) 
(10) Patent No.: US 6,519,618 B1
(45) Date of Patent: Feb. 11, 2003

(54) REAL ESTATE DATABASE SEARCH METHOD

(76) Inventor: Steven L. Snyder, 4457 McIntosh Park Dr. Suite 1013, Sarasota, FL (US) 34232

( * ) Notice: Subject to any disclaimer, the term of this patent is extended or adjusted under 35 U.S.C. 154(b) by 331 days.

(21) Appl. No.: 09/704,907

(22) Filed: Nov. 2, 2000

(51) Int. Cl.[7] .......................... G06F 7/00; G06F 17/00
(52) U.S. Cl. ............................ 707/704.1; 707/3; 707/4
(58) Field of Search ................. 707/1–10, 100–104.1

(56) References Cited

U.S. PATENT DOCUMENTS

| | | | | |
|---|---|---|---|---|
| 5,355,474 A | * | 10/1994 | Thuraisngham et al. | 707/9 |
| 5,754,850 A | * | 5/1998 | Janssen | 707/104.1 |
| 6,038,566 A | * | 3/2000 | Tsai | 707/102 |
| 6,321,202 B1 | * | 11/2001 | Raveis, Jr. | 705/1 |
| 6,484,176 B1 | * | 11/2002 | Sealand et al. | 707/10 |

* cited by examiner

Primary Examiner—Greta Robinson
Assistant Examiner—Linh Black
(74) Attorney, Agent, or Firm—Anton J. Hopen; Smith & Hopen, PA

(57) ABSTRACT

The present invention provides a method of searching a plurality of MLS databases including accessing a plurality of MLS databases, resolving an array of schemas from the plurality of MLS databases, establishing a first array of common fields from the array of schemas, establishing a second array of distinct fields from the array of schemas, displaying a search query interface including the first array of common fields and the second array of distinct fields, selecting a root database from the plurality of MLS databases, selecting at least one child database from the plurality of MLS databases, and returning a search query against the root database wherein data from the at least one child database is only included for common fields selected in the search query interface.

5 Claims, 10 Drawing Sheets

FIG. 6

MULTI-MLS SEARCH SYSTEM

File  Edit  View  Bookmarks  Tools  Help

Address: http://www.resproperty.com/main3.asp?ID=n3j22

Choose Property Type for Search — 160 — Choose Root MLS Service for Search
CONDOMINIUMS ▼ — 140           NAPLES ▼

AMENITIES*
BATHS FULL
BATHS HALF
BEDROOMS
BOAT ACCESS*
BUILDING HEIGHT*
CARPORT
CONSTRUCTION
DATE LISTED
DATE SOLD
FURNISHED
GARAGE
INTERIOR FEATURES*
LISTING STATUS
LOT LOCATION
MAINTENANCE*
MLS NUMBER
NEW CONSTRUCTION?
POOL

* Indicates a field distinct to the root MLS database.

— 150

FROM: 3
TO ▼
TO: 4

Type in the range of BEDROOMS in the "From" and "To" sides: Such as 3 "To" 4

[ADD TO SEARCH]

170

AREA - Naples or Fort Myers
BEDROOMS – From 3 to 4
LISTING STATUS - Active

180

[SEARCH]

FIG. 10

MULTI-MLS SEARCH SYSTEM

File  Edit  View  Bookmarks  Tools  Help

Address http://www.resproperty.com/main3.asp?ID=n3j22

Choose Property Type for Search    160    Choose Root MLS Service for Search

CONDOMINIUMS ▼  — 140    FORT MYERS ▼

AMENITIES
BATHS FULL
BATHS HALF
BEDROOMS
BOAT ACCESS
BUILDING HEIGHT
CARPORT
CONSTRUCTION
DATE LISTED
DATE SOLD
FURNISHED
GARAGE
INTERIOR FEATURES
LISTING STATUS
LOT LOCATION
MAINTENANCE
MLS NUMBER
NEW CONSTRUCTION?
POOL

RECORD COUNT
189

190    170

☐ CUSTOM MIRRORS
☐ ELEVATOR*
■ FIREPLACE
☐ FOYER
☐ FRENCH DOORS
☐ HANDICAP*
■ LAUNDRY TUB

ADD TO SEARCH

AREA - Fort Myers or Naples
INTERIOR FEATURES – Fireplace or Laundry Tub
INTERIOR FEATURES – Fireplace or Laundry Tub
LISTING STATUS - Active

180

200    REMOVE    SEARCH

REAL ESTATE DATABASE SEARCH METHOD

FIELD OF INVENTION

This invention relates to computerized database and file accessing and retrieval, and more specifically to refining query results made across a plurality of multiple listing service databases when searching for real estate property listings.

BACKGROUND OF THE INVENTION

The marketing of real estate on the Internet is notoriously well-known. Although real-estate listings have long been available through many types of electronic mediums such as the "bulletin-board" systems of the 1980s and early 1990s, the explosive growth of the World Wide Web (herein "WWW") has provided a rich, graphical medium for which real estate marketing has benefited tremendously.

The logistics of real estate sales put great emphasis on database technologies.

The logistics of real estate sales put great emphasis on database technologies. Databases serve the market well by providing a searchable store of relevant information to properties. Real estate agents generally have access to a multiple listing service (herein "MLS"). A MLS is a local database that lists homes for sale. Member real estate agents can access the MLS and show listed homes to potential buyers. More recently, MLS systems are finding their way into the homes and computers of the end-consumers. Real estate agents, once the gatekeepers of such information, now share much of the same information with the potential real estate purchaser.

However, as databases were created to serve MLS systems worldwide, no standard structure was universally adopted. Accordingly, two neighboring MLS areas might have completely different database structures. Nevertheless, some common fields are almost always found in any MLS database such as:

(1) number of bathrooms;
(2) number of bedrooms;
(3) total square footage of dwelling; and
(4) year built.

Modern MLS systems typically contain fields that cover attributes deemed important within the geographic market. For example, a costal area might place a premium on homes that overlook the ocean. Accordingly, a first MLS system in the costal area might contain one or more fields in its database to indicate the view or proximity to the ocean. However, a neighboring area with a second MLS system might be landlocked with no corresponding database field for an ocean view.

A problem occurs when a search is attempted across multiple MLS systems. In the above-mentioned example, it is standard practice to compare the first and second MLS systems for fields common to both. Such fields will almost always be (1) number of bathrooms; (2) number of bedrooms; (3) total square footage of dwelling; and (4) the year in which the dwelling was constructed. In practice, many other fields might be included such as swimming pools and fireplaces. However, in the process of selecting only the common fields to search, a significant diminution occurs in the precision of the search. In the above-mentioned example, because the second MLS does not have a field for "ocean view," it is excluded in the multiple MLS search system.

Accordingly, what is needed in the art is a method of seamlessly searching for property records across a plurality of MLS databases with sacrificing the specificity or resulting accuracy of the available search criteria.

It is, therefore, to the effective resolution of the aforementioned problems and shortcomings of the prior art that the present invention is directed.

However, in view of the prior art in at the time the present invention was made, it was not obvious to those of ordinary skill in the pertinent art how the identified needs could be fulfilled.

SUMMARY OF THE INVENTION

The present invention provides a method of searching a plurality of MLS databases comprising the steps of accessing a plurality of MLS databases, resolving an array of schemas from the plurality of MLS databases, establishing a first array of common fields from the array of schemas, establishing a second array of distinct fields from the array of schemas, displaying a search query interface including the first array of common fields and the second array of distinct fields, selecting a root database from the plurality of MLS databases, selecting at least one child database from the plurality of MLS databases, and returning a search query against the root database wherein data from the at least one child database is only included for common fields selected in the search query interface.

The MLS databases may be accessed by any conventional means whether by a local area network or by a wide area network. In a preferred embodiment of the invention, updated records for each database are uploaded on a daily basis to a central storage server. This alleviates bandwidth issues by placing the necessary data in close network proximity to the database processing means. To some extent, every database has an organizational structure, or a schema. At a very basic level, part of the schema illustrates the fields, tables and records that make up the individual MLS database. While two databases might appear to hold the exact information, they may have substantially different schemas. For example, two databases might hold the names of real estate agents. The first database stores each agent's first name, middle initial and last name in separate fields. However, the second database may store the agent's entire name in a single field. Integrating these two databases is not necessarily difficult, although some processing logic might be needed to intelligently map duplicate entries.

A more difficult scenario exists when the first database has a field for "organizational memberships" and the second database is completely lacking of that field. For example, if a search is requested to find all real estate agents who are members of the ABC Group within both databases, a significant problem exists. Members of the ABC Group in the first database will be returned by the search, but members of the ABC Group in the second database will not be returned. Accordingly, the search results are invalid as to the second database. In a multiple database search, non-corresponding fields are typically disabled across the board. Therefore, the above-mentioned invalid search would not be returned. However, that leaves the searcher with fewer options.

Therefore, according to the present invention, from the array of schemas, a first array of common fields and a second array of distinct fields are established. Common fields are those that have substantial equivalence across multiple databases. For example, a combination of fields of first name, middle initial and last name would form a substantial equivalent to a single field with the full name. Modern database techniques, such as the SQL syntax provide powerful logic tools to map substantially equivalent fields together. However, fields that cannot be mapped, even with the use of applied logic, are considered distinct fields. For example, a first MLS database that has a Boolean field value for "mountain view," may have absolutely no equivalent in a second MLS database, no matter how much intelligence is applied in the process. Accordingly, the "mountain view" field would be considered distinct.

A search query interface is provided that displays the aggregate of the first array of common fields and the second array of distinct fields. An indicia means may be provided for each field displayed in the search query interface to indicate whether each field is common or distinct. The indicia means may be an asterisk, font modification, graphic icon or the like. The indicia may also include placing the common and distinct fields in separate list boxes. The indicia means serve the purpose of warning the end user that selection of a common field will permit a seamless search across all databases, while a selection of a distinct field will restrict the search to the root database.

A root MLS database is selected from the plurality of MLS databases. The root database will always be searched no matter what distinct fields are selected. At least one child database is selected from the plurality of MLS databases. In most cases, the number of child databases selected will have a relationship to the number of distinct fields listed. For example, if a root database and first child database share 80% of all the fields, then only 20% of the fields will be distinct. However, if a second child database is added that shares 80% of the fields with the root database and 80% of the fields with the first child database, the number of distinct fields could rise to as much as 60%.

Nevertheless, the end user makes the choice regarding field selection, not the query designer. When a search query is made against the root database, data from the child database or plurality of child databases is only included for common fields selected in the search query interface. In the event that the end user selects a distinct field that excludes a child database from a search, the end user is notified that the scope of the search is restricted. This might be through visual or audio feedback from the search query interface. The end user may also swap the designation of root and child between two databases in a subsequent search.

It is therefore an object of the present invention to provide a method of searching multiple MLS databases having different schemas without comprising the accuracy of the search results.

It is another object of the present invention to provide a method of searching multiple MLS databases wherein the end user has the ability to decide whether to exclude a second database by selecting to search a distinct field in a first database.

It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 6 is a search query interface display of the current invention wherein search criteria for three to four bedrooms is selected for two MLS databases.

FIG. 10 is a search query interface display of the current invention wherein a query criteria removal means and a record count display are provided.

DETAILED DESCRIPTION OF THE PREFERRED EMBODIMENT

Figure 1:
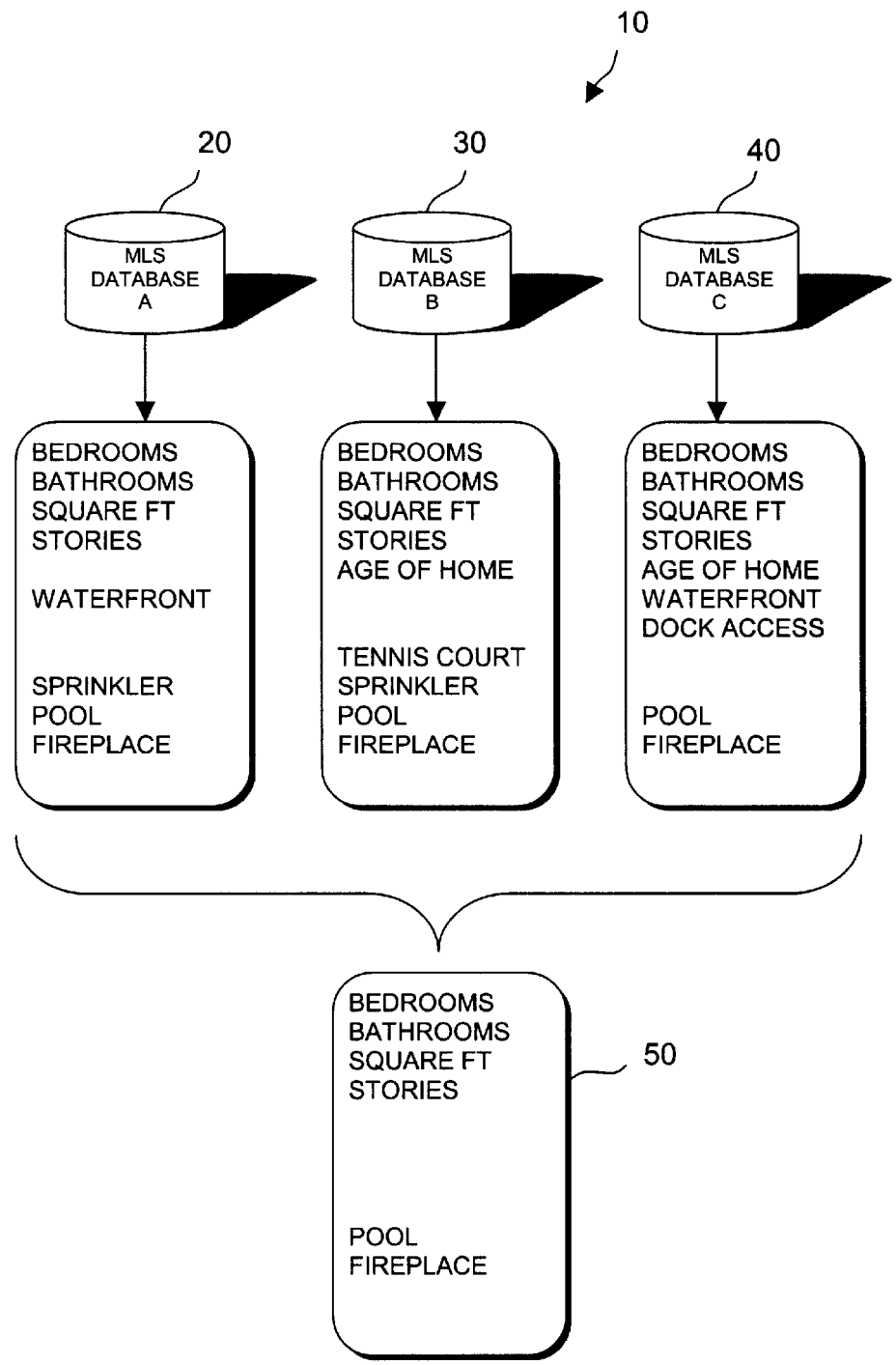
FIG. 1 is a functional block diagram of the prior art.

FIG. 1 shows the prior art method of searching a plurality of MLS databases generally designated as 10. Three databases 20–40 each contain unique collections of database fields. For example, some fields are notoriously common to MLS property listings such as number of bedrooms, number of bathrooms, square footage, number of stories, and the like. However, while the first database 20 and the third database 40 contain a field for waterfront, the second database 30 does not have that field. Furthermore, only the third database 40 has a field for dock access. Conventional search techniques remove all but the common fields across the databases leaving a resultant array of fields 50 which are common to the first database 20, the second database 30, and the third database 40. In the example, eleven unique fields existed across the three databases. However, only six remain in the resultant array of fields 50.

Figure 2:
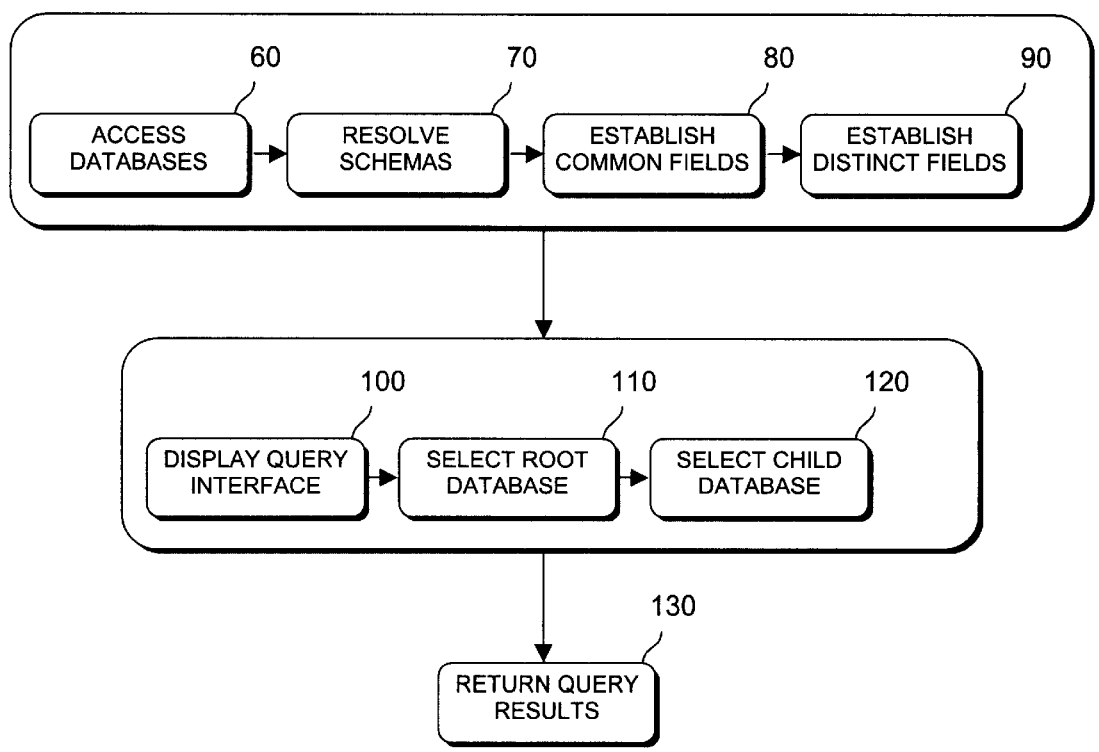
FIG. 2 is a functional block diagram of the current invention.

FIG. 2 illustrates the fundamental process in which the current invention is employed. A plurality of MLS databases are accessed 60 from which an array of schemas are resolved 70. A first array of common fields 80 is established along with a second array of distinct fields 90 from a comparison of the database schemas. A search query interface is displayed 100 listing the first array of common fields and the second array of distinct fields. A root database is selected 110 and at least one child database is selected 120 from the plurality of MLS databases. A search query is returned 130 against the root database wherein data from the at least one child database is included only when common fields are selected in the search query interface.

In a preferred embodiment of the invention, indicia means are provided for each field displayed in the search query interface to indicate whether each field is common or distinct. The indicia means would typically include a graphic icon, distinct font style, text notion, form check box or radio button, or the like.

Figure 3:
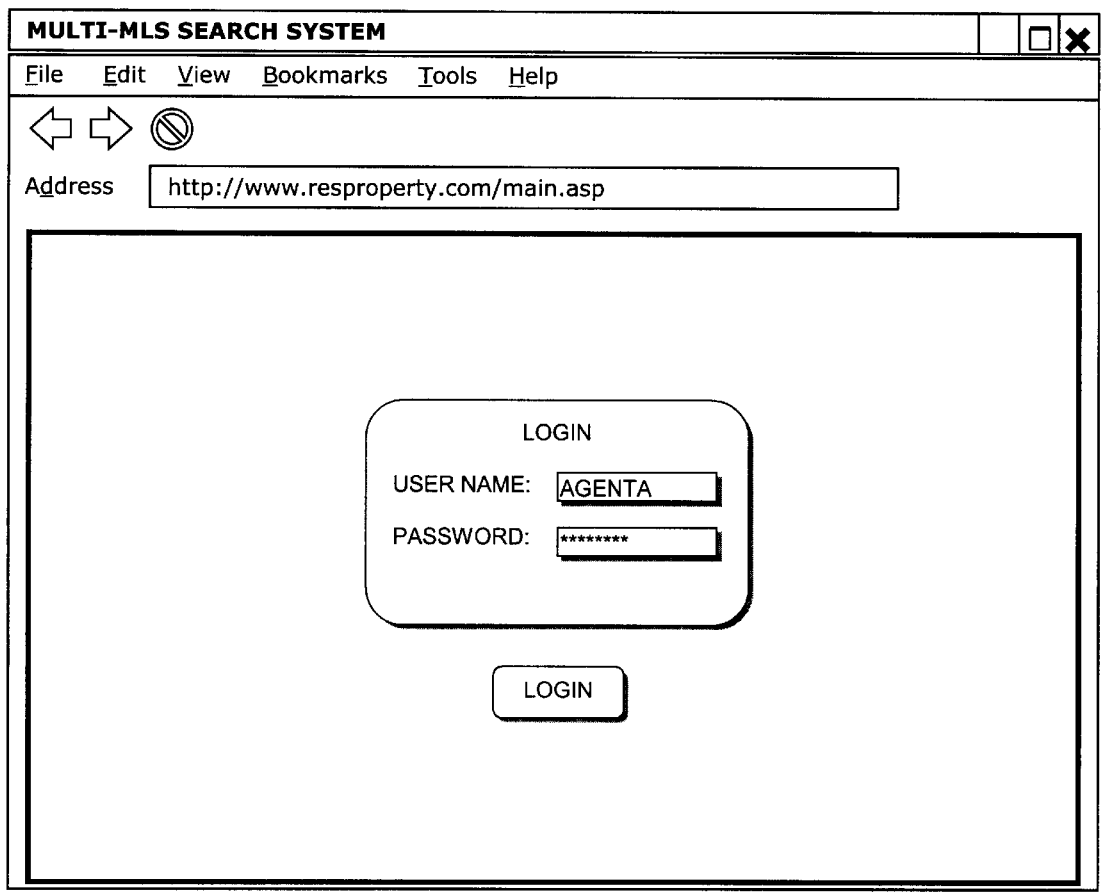
FIG. 3 is a security display interface in an illustrative embodiment of the current invention.

In FIG. 3, a login interface is presented within a web browser application. Real estate agents typically pay a subscription fee to access each MLS database. In a preferred embodiment of the invention, a single login user name and password serves to properly authenticate the user and provide access only to those databases for which a subscription has been paid. Accordingly an end user that desires to search five MLS databases in one area might expect to pay a higher subscription fee that another end user that searches only two MLS databases.

Figure 4:
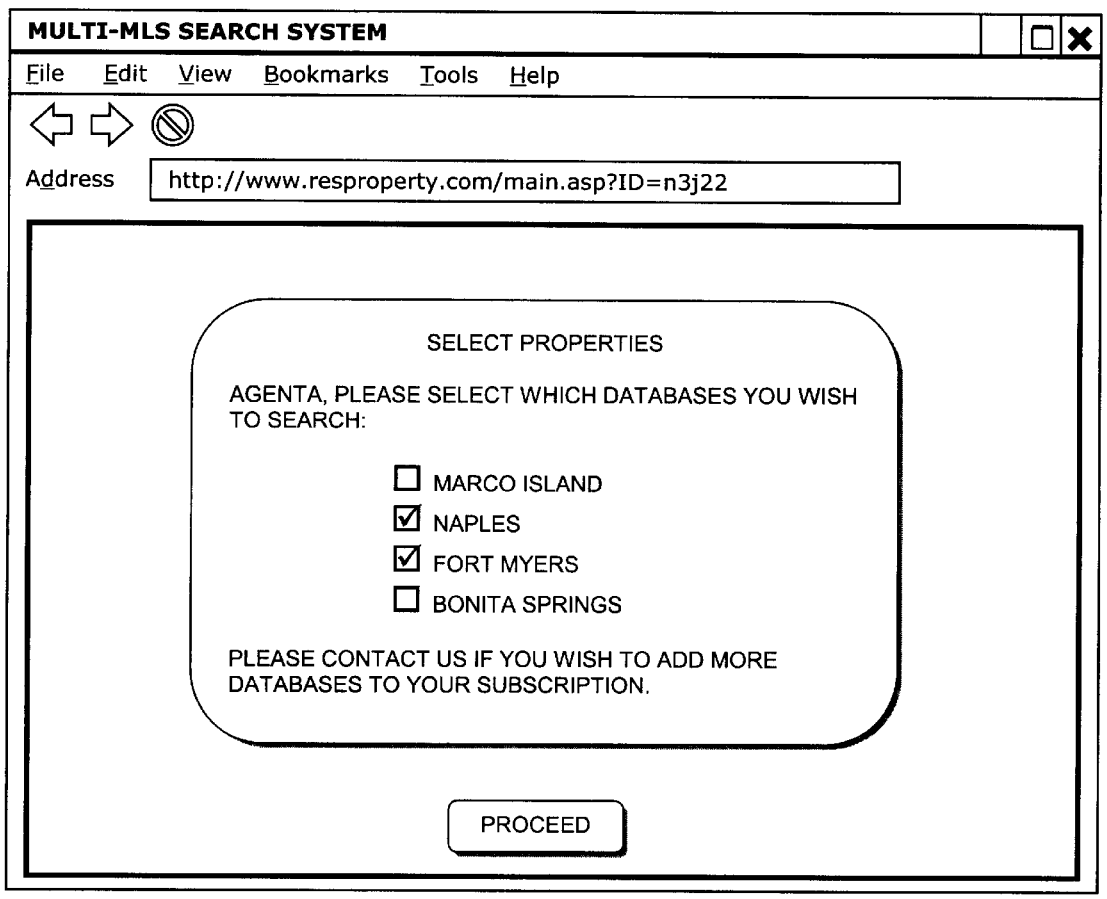
FIG. 4 is a database selection display interface in an illustrative embodiment of the current invention.

FIG. 4 illustrates a subsequent screen in the login process. In this screen, the end user is presented with a list of databases for which he or she is properly subscribed to: (1) arco Island; (2) Naples; (3) Fort Myers; and (4) Bonita Springs. While the end user may wish to search all the databases concurrently, the end user may also have the option to select less than all of those available databases.

Figure 5:
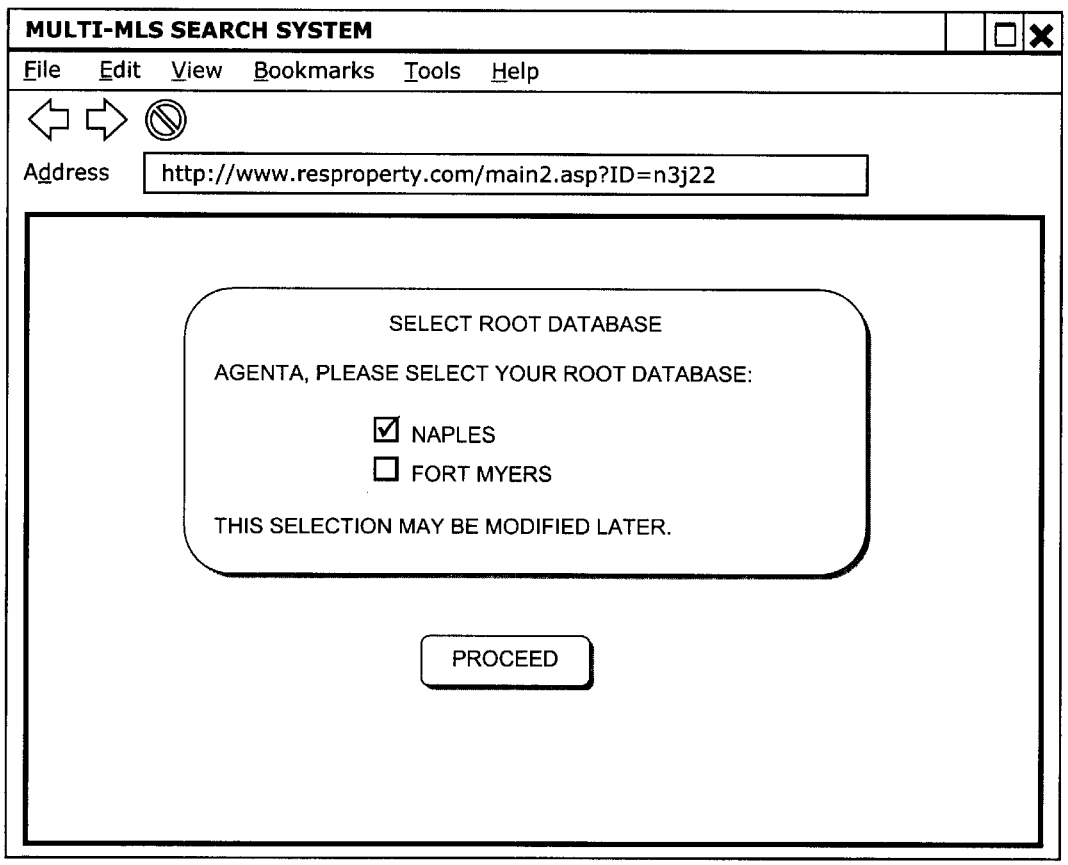
FIG. 5 is a root database selection display interface in an illustrative embodiment of the current invention.

FIG. 5 illustrates the selection of the root database. In some instances, the system would automatically pre-select the root database according to the home office of the end user. For example, if the real estate agent were based out of Fort Myers, the Fort Myers MLS database would automatically be selected as the root database subject to change if the end user so wished. Accordingly, the end user might pre-select which database will be considered the root database, or the system may resolve a default value for the end user in order to proceed directly to the search query interface. In this embodiment, an end user profile is created and the root database is designated according to the end user profile.

FIG. 6 illustrates on embodiment of the search query interface. A property type may be selected 140 for condominiums, single family homes and the like. This designation is useful as property types tend to have unique fields associated with them. A category list box 150 provides an array of fields designated as common or distinct by an indicia means, in this case, an asterisk. The root database combo box 160 indicates that the NAPLES MLS database is currently serving as the root database. A property select box 170 displays the specific query forms needed to construct the appropriate query. In this example, bedrooms are selected which is served most appropriately by a range of values. However, purely yes and no query items, such as whether the property has a fireplace is best served by a Boolean-type check box. Going back to FIG. 6, when the range of bedrooms is entered in the property select box 170, it may be added to the search criteria and displayed in a query list box 180. In this example, the query list box 180 indicates that the query search will return records with both the NAPLES and FORT MYERS area; with either three or four bedrooms; and with an active listing status.

Figure 7:
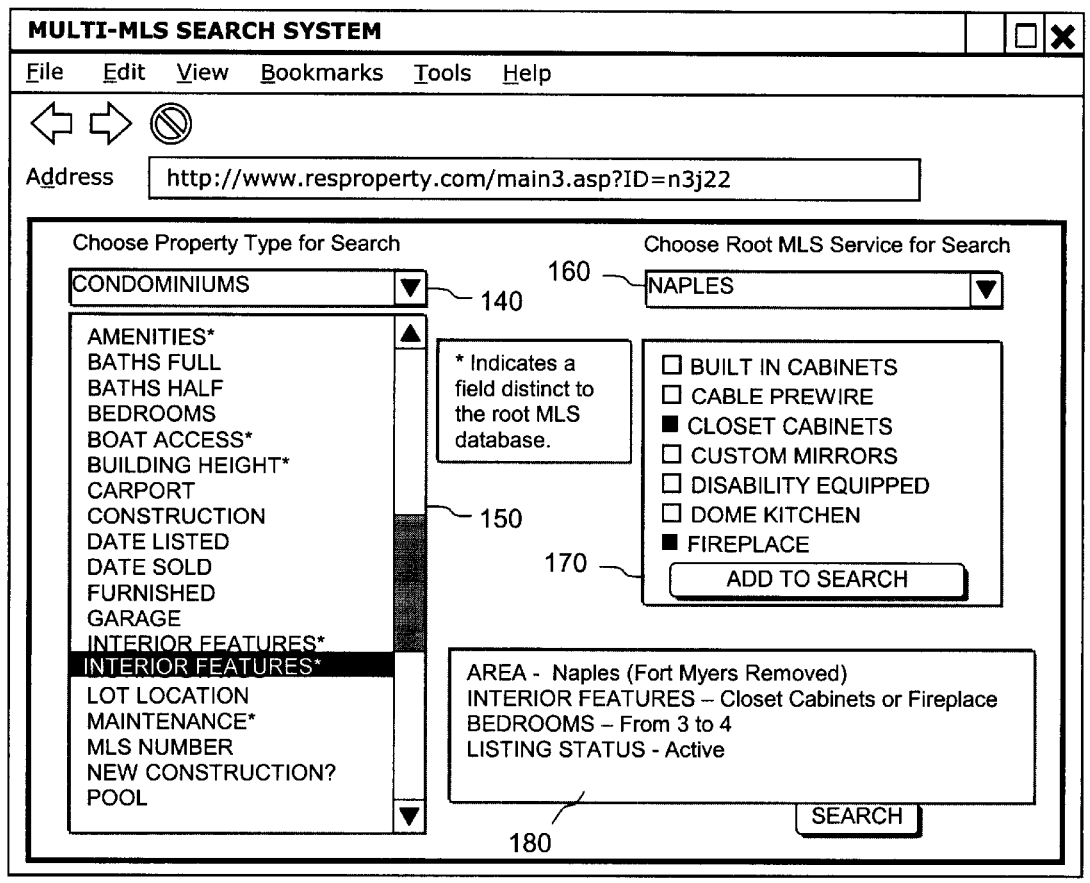
FIG. 7 is a search query interface display of the current invention wherein additional distinct field search criteria for closet cabinets and a fireplace have been added thereby removing the child database from the search.

In FIG. 7, the end user selected another listing in the category list box 150 for INTERIOR FEATURES. Once this selection is made, the property select box 170 is populated with an array of Boolean check boxes for the query. Because INTERIOR FEATURES in this example has distinct fields, this status is identified with an asterisk in the category list box 150. When INTERIOR FEATURES is selected, the child database, FORT MYERS in this case, is therein removed from the query as shown in the query list box 180. As the root database combo box 160 designated NAPLES as the root directory, NAPLES was not removed from the query.

Figure 8:
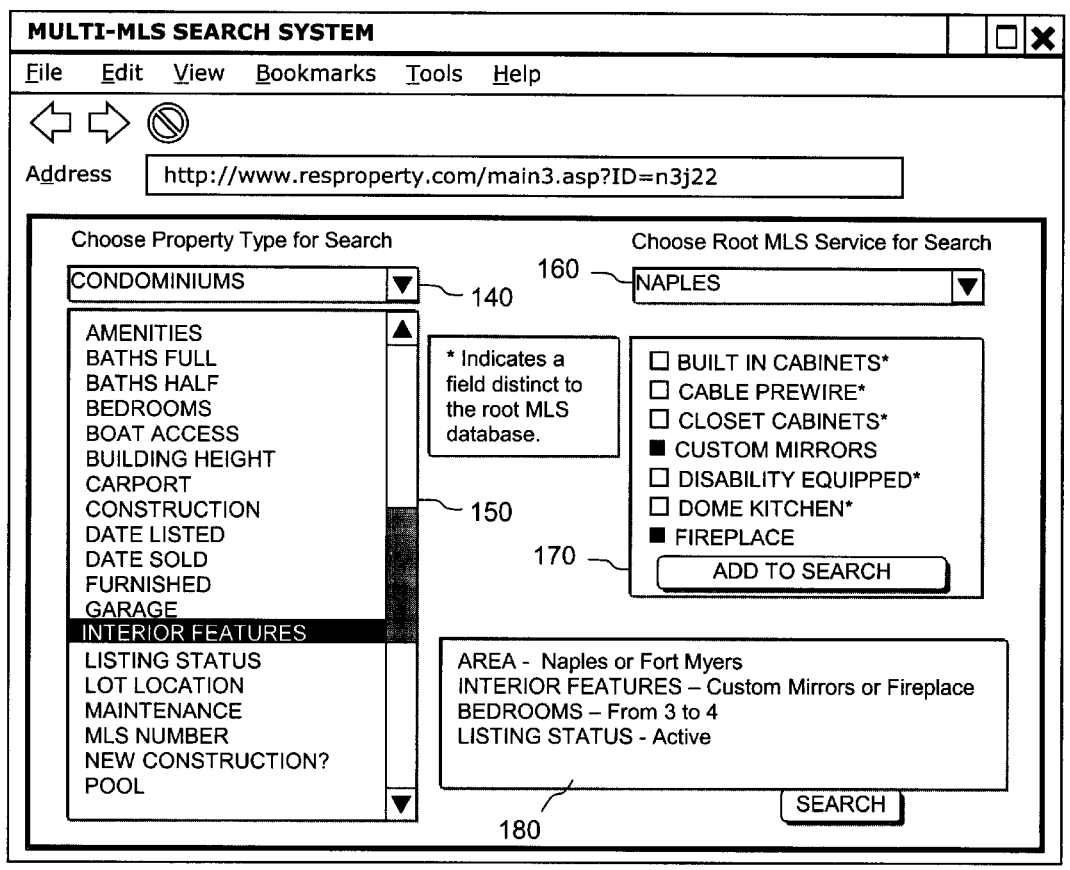
FIG. 8 is a search query interface display of the current invention wherein groups of categorized fields within the root and child databases are displayed in a field category listing.

In FIG. 8, an alternative approach is taken to designating the common and distinct fields. An array of common search categories are established and used to populate the category list box 150. Selection of one or more items in the category list box 150 does not exclude child databases from the query. Within each search category in the array, common and distinct fields are assigned. Accordingly, in FIG. 8, the common search categories are displayed in the category list box 150. A selection means is provided for selecting at least one search category within the array of common search categories. The selection means might be a Boolean check box field, a drop down box, a list box or any other known interface form. Distinct and common fields populate the property select box 170 from multiple MLS databases, both root and child. Fields are that distinct to the root database are indicated by an asterisk. Therefore, by categorizing the distinct and common fields into general categories, a more expansive search may be conducted. In the illustrative example in FIG. 8, both the NAPLES and FORT MYERS area are searched for three to four bedrooms, active listing status, custom mirrors and a fireplace. If the same search was conducted using the method illustrated in FIG. 7, only the NAPLES area could be searched.

Figure 9:
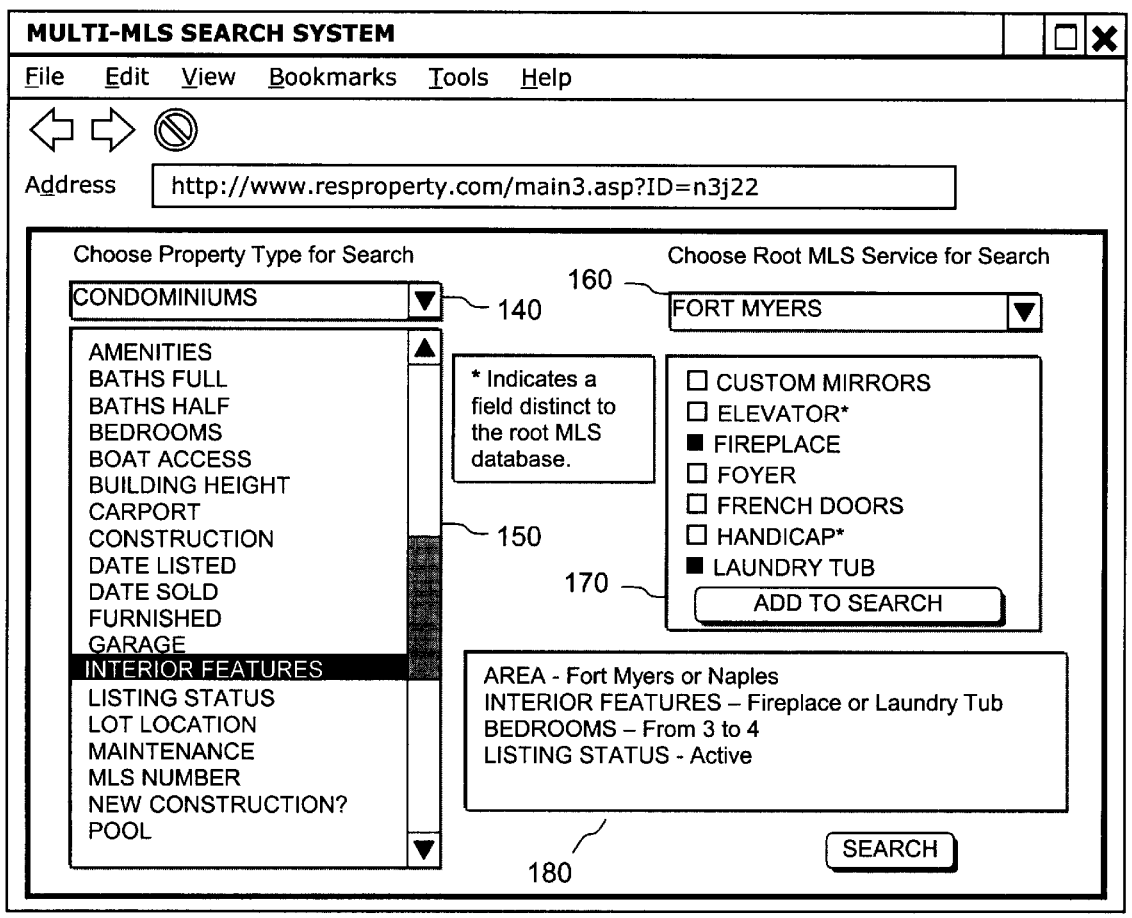
FIG. 9 is a search query interface display of the current invention wherein the root and child database designations have been swapped.

In FIG. 9, the root database is switched in the root database combo box 160 to designate FORT MYERS as the root database. Accordingly, different database fields will populate the property select box 170. While CUSTOM MIRRORS and FIREPLACE are still resident in the property select box 170, new listings such as ELEVATOR and HANDICAP are provided with an asterisk showing they are distinct in relation to the new root database of FORT MYERS. However, provided that FIREPLACE and LAUNDRY TUB are selected, both the root and child databases will be searched.

In FIG. 10, a record count display 190 is provided to indicate to the end user the number of records current meeting the search criteria. In addition, a criteria removal means 200 is provided to back out of search criteria to expand the query. As illustrated in this example, INTERIOR FEATURES—Fireplace or Laundry Tub is selected for removal. The ability to add and remove search query criteria permit the method to be more flexible for the end user and place less constrains on including large collections of search forms on a single display interface. The query list box 180 provides the current search query criteria in an easy to understand form.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claim is:

1. A method of searching a plurality of MLS databases comprising:

accessing a plurality of MLS databases;

resolving an array of schemas from said plurality of MLS databases;

establishing a first array of common fields from said array of schemas;

establishing a second array of distinct fields from said array of schemas;

displaying a search query interface including said first array of common fields and said second array of distinct fields;

designating a root database from said plurality of databases;

designating at least one child database from said plurality of MLS databases;

returning a search query against said root database wherein data from said at least one child database is only included for common fields selected in said search query interface.

2. The method set forth in claim 1, further comprising:

providing an indicia means for each field displayed in said search query interface to indicate whether each field is common or distinct.

3. The method set forth in claim 1, further comprising:

providing a switch means wherein the root and child designation may be swapped between two databases.

4. The method set forth in claim 1, further comprising:

establishing an end user profile; and designating said root database according to said end user profile.

5. The method set forth in claim 1, further comprising:

establishing an array of common search categories;

assigning said common and distinct fields into said array of common search categories;

displaying said array of common search categories;

providing a selection means for selecting at least one search category within said array of common search categories;

displaying a field category listing containing said common and distinct fields previously assigned into said at least one search category;

providing an indicia means for each field displayed in said field category listing to indicate whether each field is common or distinct.

* * * * *